March 21, 1961 H. H. GRUNDELMAN 2,975,885
OFFICE CONVEYOR
Filed Oct. 30, 1959 2 Sheets-Sheet 1

March 21, 1961  H. H. GRUNDELMAN  2,975,885
OFFICE CONVEYOR

Filed Oct. 30, 1959  2 Sheets-Sheet 2

INVENTOR
HERMAN H. GRUNDELMAN
BY
ATTORNEY

2,975,885
OFFICE CONVEYOR

Herman H. Grundelman, Woodcliff Lake, N.J., assignor to Mercury Handling Systems, Inc., a corporation of New York Filed Oct. 30, 1959, Ser. No. 849,817

10 Claims. (Cl. 198—160)

My invention relates to office conveyors for transferring information back and forth between physically separated stations.

The enormous expansion of American government and business during the last several decades has been accompanied by a more than corresponding increase in "paper work" and concomitant clerical operations. While many new techniques, such as the use of computers and other types of business machines, have been developed to reduce the costs of such opeartions, certain types of operations are not susceptible to the use of such techniques. In particular, for example, brokerage houses must still employ large numbers of clerks who make entries on various paper forms, the partially completed forms being subsequently hand carried to other clerks for further processing.

I have invented a new type of office conveyor which mechanically and automatically transfers sheets carrying information back and forth between operators positioned at physically separated stations. As a consequence, hand to hand transport is eliminated, thus decreasing the time and cost of the entire operation.

Accordingly, it is an object of my invention to provide a new and improved type of office conveyor.

Another object is to provide an office conveyor adapted for transferring sheets carrying information back and forth between physically separated stations in such manner that the direction of transfer can be readily reversed at will.

Still another object is to provide an office conveyor wherein sheets carrying information can be transferred along any one of a plurality of parallel paths and wherein the direction of transfer along any path can be reversed without changing the direction of transfer along any other path.

Yet another object is to provide a new type of office conveyor which can be prefabricated in various standard sizes and further, which can be assembled or disassembled easily.

Still a further object is to provide an office conveyor utilizing a plurality of endless belts for transferring sheets carrying information between separated stations, the tension of each belt being individually controlled to prevent slippage while maintaining a constant belt travel speed.

Yet a further object is to provide an office conveyor which can be easily used by unexperienced operators and which requires little or no maintenance.

These and other objects of my invention will either be explained or will become apparent hereinafter.

In accordance with the principles of my invention, my conveyor utilizes first and second parallel, horizontally displaced shafts which, when driven by corresponding first and second driving means, can be rotated in opposite directions. A first set of spaced apart pulleys is rotatably mounted about the first shaft; a second set of spaced apart pulleys is rotatably mounted about the second shaft. Each set contains the same number of pulleys, corresponding pulleys in both sets having the same relative positions along the corresponding shafts, thus forming a plurality of pairs of pulleys. Each pulley is provided with a separate rotation adjustment mechanism so as to permit each pulley either to rotate freely and independently of the shaft to which the pulley is secured or to be clamped to this shaft and rotate therewith. Corresponding pairs of pulleys (one on each shaft) are adjusted to rotate in the same direction, although different pairs can have the same or opposite directions of rotation.

I further provide a plurality of parallel guide rails which extend horizontally between the two shafts. These rails are interposed between and positioned above corresponding pairs of pulleys on both shafts.

My conveyor utilizes a plurality of endless belts, the number of belts being equal to the number of pulleys in either set. Each belt extends around and between a corresponding pulley on both shafts and is driven thereby, the direction of belt rotation being determined by the direction of rotation of these pulleys. Further, the tension of each belt is separately controlled by individual belt tensioning means.

Each belt is interposed between and underneath a pair of guide rails and rotates freely thereunder. The vertical clearance between the belt and these rails is adjusted to be large enough to prevent binding and, further, is small enough to prevent paper sheets transferred along the belt from being caught and jammed between belt and guide rails.

The rails are formed in sections of standard lengths. The rails can be so constructed that adjacent rail sections can be interlocked and aligned in such manner that the common joints will not interfere with the operation; i.e. paper sheets can travel freely between rails toward either one of the other of the shafts without being caught and "hung up" by a small obstruction at a common joint.

Alternatively, the rail sections can be butted together and jets of air can be used to prevent these sheets from being caught on such an obstruction.

By individually adjusting the appropriate rotation adjustment mechanisms, the direction of travel of one or more belts can be reversed with respect to the direction of travel of the remaining belts, or, if desired, all belts can travel in the same direction.

In operation, sheets of paper carrying information can be fed onto the belts and transported toward one or another of the shafts, whereby operators stationed at various points along the rails can remove sheets from the belts, or can feed additional sheets onto the belts, as desired. Further, special paper stops can be inserted between adjacent rails (these stops being free of contact with the appropriate belt or belts) to stop the travelling sheets at any desired position intermediate the two shafts and, at the same time, to permit unhampered belt rotation.

An illustrative embodiment of my invention will now be described with reference to the following drawings wherein:

Fig. 1a is an isometric cut-away view of the left hand side of an office conveyor in accordance with the invention;

Fig. 1b is an isometric cut-away view of the right hand side of the conveyor of Fig. 1a;

Figure 1:
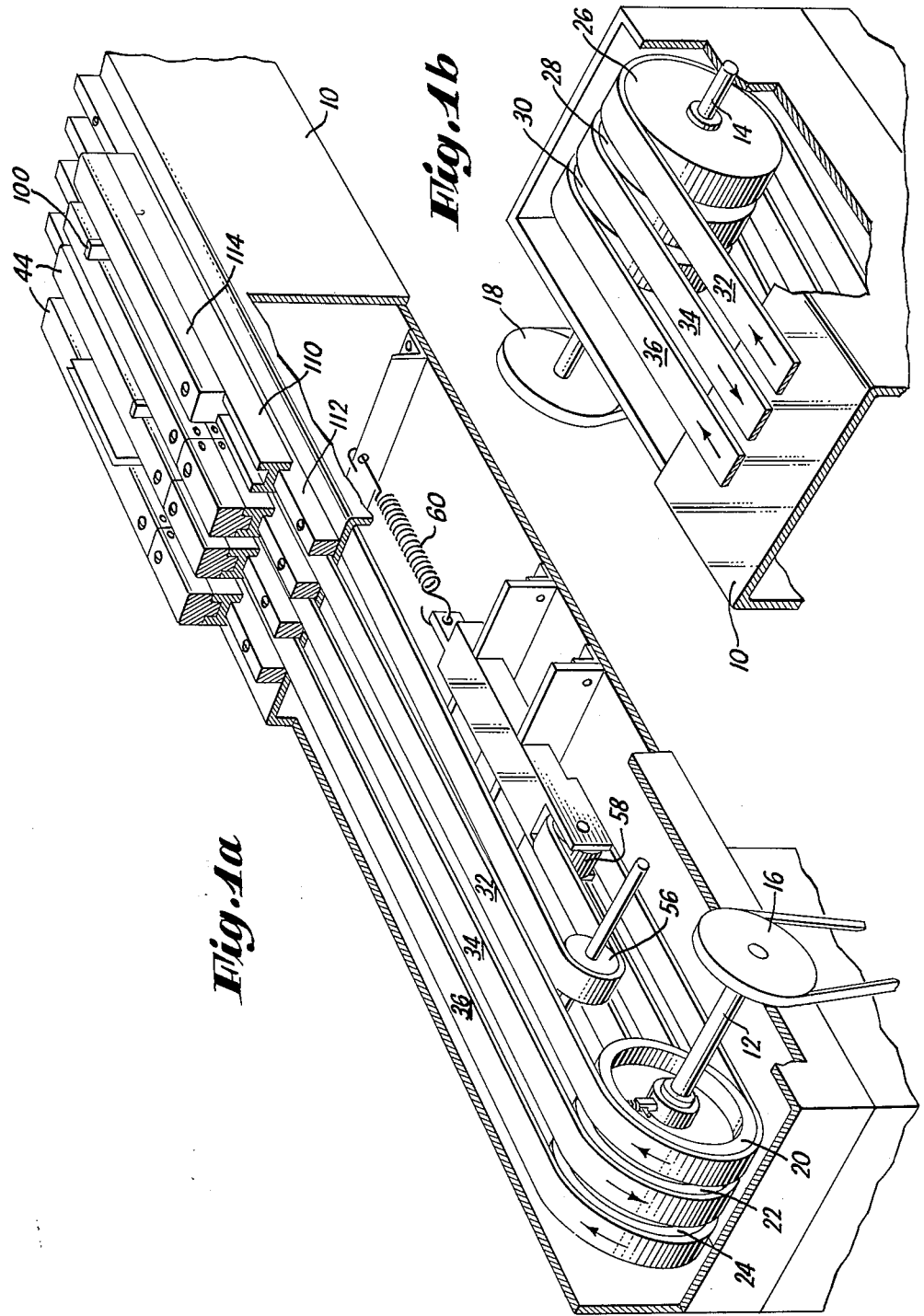

Referring now to Fig. 1, there is shown an office conveyor having a conveyor bed 10. First and second horizontally separated shafts 12 and 14 are rotatably secured to opposite ends of bed 10. Each shaft is rotatably driven through a chain and sprocket drive by corresponding first and second motor driving means 16 and 18. Shafts 12 and 14 rotate in opposite directions.

A first set of driving pulleys, in this example three pulleys 20, 22 and 24, are rotatably mounted about shaft 12 in equidistantly spaced positions. Similarly, a second set of three equidistantly spaced driving pulleys 26, 28 and 30 are rotatably mounted about shaft 14. Corresponding pulleys on both shafts have the same relative positions thus forming pulley pairs 20—26, 22—28 and 24—30. Each pulley, as will be explained in more detail hereinafter, is provided with a separate rotation adjustment mechanism which permits each pulley to be clamped to its shaft and rotate therewith or to rotate freely and independently of this shaft.

The conveyor is provided with three endless belts 32, 34 and 36, each of which extends around and between a corresponding pulley pair and is driven thereby. As shafts 12 and 14 are rotated, the belts rotate in directions determined by the direction of rotation of those driving pulleys which are clamped to their corresponding shafts. (Note that in each pulley pair, one pulley is clamped to its shaft and rotates therewith, while the other pulley in this pair rotates freely. The direction of rotation of any belt is thus determined by the particular shaft to which the clamped pulley is secured.) In general, some belts rotate in one direction, while other belts rotate in an opposite direction.

The conveyor further includes four separate parallel guide rails 44, each of which is vertically positioned above one or another edge of a belt. In other words, each belt is interposed between and underneath a pair of adjacent guide rails and rotates freely thereunder. Paper sheets can be fed between adjacent rails onto the belt below, the belt then transferring the sheets so fed toward one or another of shafts 12 and 14.

Operators stationed on either side of the conveyor at separated positions along the guide rails can remove sheets from the conveyor and add sheets to the conveyor as desired. Since certain belts are travelling in opposite directions, sheets can be transferred back and forth between operator stations as desired by removing one or more sheets from one belt and subsequently feeding such sheet or sheets onto an oppositely travelling belt.

By inserting paper stops 100 between adjacent guide rails (as shown in detail in Fig. 1a), the sheets transferred by the appropriate belt can be caught and held in any selected position intermediate the two shafts. The stops terminate at a point above the belt; since there is no contact between stop and belt, the stops do not impede belt rotation.

The vertical clearance between the belts and guide rails must be carefully adjusted to be large enough to prevent the belts from binding and at the same time to be small enough to prevent paper sheets from being caught and jammed between belt and guide rail. For standard 8½ x 11 inch sheets a useful clearance is about ⅟₁₆ inch.

As will be seen from Figs. 1a and 1b, each belt while driven by the pulleys also rides along one or more snub rollers 54, one or more take-up rollers 56 and one or more return rollers 58. In order to simplify maintenance and eliminate any corrosion problems, these rollers can be formed from hard wood impregnated with a solid lubricant, for example, rock maple impregnated with tallow. Tension on each take-up roller 58 is maintained by a tension spring 60.

Figure 2:
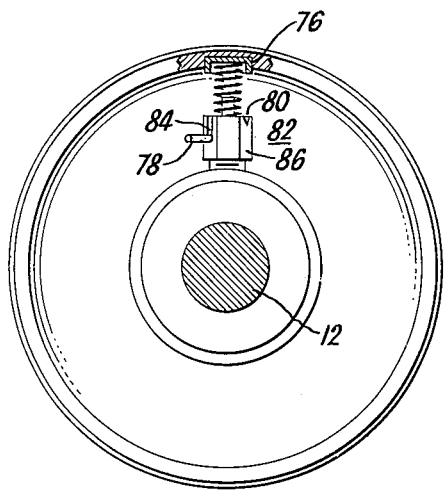
Fig. 2 is an elevation view of the pulley adjustment mechanism which can be utilized in the conveyor of Figs. 1a and 1b.
Figure 3:
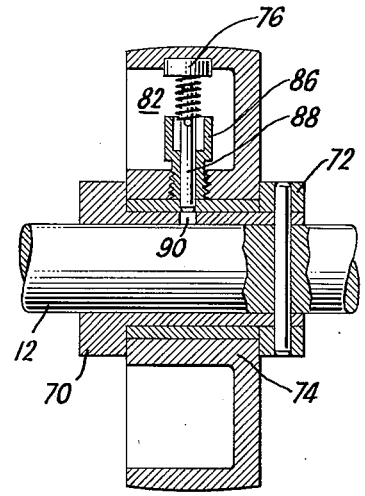
Fig. 3 is a cross sectional view of the mechanism of Fig. 2.

The pulley rotation adjustment mechanism for each pulley, for example pulley 20, is shown in detail in Figs. 2 and 3. A steel tubular collar 70 is pinned to one of shafts 12 and 14 and rotates therewith. A bronze porous bushing 72 capable of absorbing oil rides freely on collar 78. This bushing is press fitted into the hub 74 of the pulley 20 (which can, for example, be formed of aluminum). A trigger lock assembly 82 is screwed through the hub 74 and is held in position by means of a spring and retainer cap 76. A trigger lever 78 can be positioned either in a high notch 80 or a low notch 84 in the barrel 86 of the assembly 82. A pin 88 projecting out of the bottom of assembly 86 is moved up or down in accordance with the position of lever 78.

With the lever in the low notch 84, the pin 86 enters one or another of holes 90 in the collar 70, thus locking or clamping the pulley to the drive shaft and causing both pulley and shaft to rotate in the same direction. With the lever in the high notch 80, the pin is moved out of the holes, and the pulley can rotate freely and independently of the shaft (i.e. the pulley is free to rotate in either direction).

Hence, in order to select the direction of rotation of any belt, it is first necessary to select the one shaft which rotates in this direction. The pulley of the appropriate pair which is mounted on this shaft is then clamped thereto and rotates therewith, while the other pulley in this pair is not locked to its shaft and is permitted to rotate freely.

For optimum efficiency each pulley should have a tapered crown, for example, a crown of two or three degrees.

The guide rails are formed in sections of standard lengths as, for example, ten foot lengths. When the conveyor is longer than this standard length (a typical conveyor length, for example, can range between ten and one hundred feet), several rail sections must be connected end to end. If these sections are not accurately aligned, a slight obstruction can be formed at the joints, and this type of obstruction can prevent the paper sheets from travelling freely in one direction or another.

I have found that such obstructions can be eliminated by constructing the rail sections in the manner shown in Fig. 1a. Each section can comprise a central member 110 having an H-shaped cross section, a tongue like lower interlocking member 112, and an upper bevelled member 114. By fitting several of these sections together with a tongue and groove fit, accurate alignment is obtained.

Figure 4:
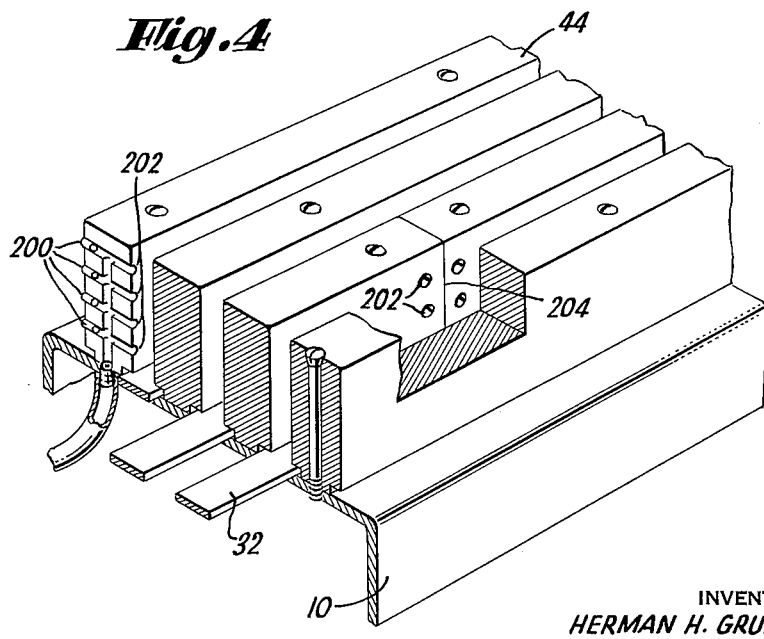
Fig. 4 is a detail view of another type of guide rail construction which can be utilized in this conveyor.

The rail construction shown in Fig. 1b is particularly useful when the guide rails are formed from a hard wood such as maple. Alternatively, metal (for example, aluminum) or wood rails can be butted together, as shown in Fig. 4. With this type of construction, accurate alignment is extremely difficult, and I have found that obstructions are best avoided by injecting small jets of compressed air 200 and 202 between rails at positions adjacent common joints 204. These jets of air push the paper sheets away from the walls of either guide rail, thus permitting the sheets to travel freely in either direction. These jets can be produced by inserting tubes in the rail sections. Alternatively, these sections can be hollow and air can be passed through the sections and flow through openings in these sections into the space between rails.

It is to be noted that the width of the endless belts can be varied as required, a convenient width being about ¾ inch. The depth of the rails depends upon the height of the paper sheets to be transported, since the sheets must stand upright. For standard 8½ x 11 inch sheets, a useful depth is about 5 inches.

While I have shown and pointed out my invention as applied above, it will be apparent to those skilled in the art that many modifications can be made within the scope and sphere of my invention as defined in the claims which follow.

What is claimed is:

1. An office conveyor comprising first and second parallel horizontally separated rotatable shafts; driving means connected to said shafts for rotating same in opposite directions; at least one pair of pulleys, one pulley in each pair being rotatably mounted on said first shaft, the other pulley being mounted on said second shaft, each pulley being provided with a separate rotation adjustment mechanism having a first position in which the pulley is clamped to its shaft and rotates therewith and a second position in which the pulley rotates freely and independently of its shaft, the two mechanisms for each pair of pulley having different positions; and at least one endless belt mounted around and between the corresponding pulley pair and driven thereby in a direction determined by the direction of rotation of the shaft carrying the one pulley of said pair which is clamped to its shaft.

2. An office conveyor comprising first and second parallel horizontally separated rotatable shafts; driving means connected to said shafts for rotating same in opposite directions; a plurality of pairs of pulleys, one pulley in each pair being rotatably mounted on said first shaft, the other pulley being mounted on said second shaft, each pulley being provided with a separate rotation adjustment mechanism having a first position in which the pulley is clamped to its shaft and rotates therewith and a second position in which the pulley rotates freely and independently of its shaft, the two mechanisms for each pair of pulleys having different positions; and a like plurality of endless belts, each belt being mounted around and between the corresponding pulley pair and driven thereby in a direction determined by the direction of rotation of the shaft carrying the one pulley of said pair which is clamped to its shaft, at least one of said belts rotating in one direction, the remaining belts rotating in an opposite direction.

3. An office conveyor comprising first and second parallel horizontally separated rotatable shafts; driving means connected to said shafts for rotating same in opposite directions; at least one pair of pulleys, one pulley in each pair being rotatably mounted on said first shaft, the other pulley being mounted on said second shaft, each pulley being provided with a separate rotation adjustment mechanism having a first position in which the pulley is clamped to its shaft and rotates therewith and a second position in which the pulley rotates freely and independently of its shaft, the two mechanisms for each pair of pulleys having different positions; at least one endless belt mounted around and between the corresponding pulley pair and driven thereby in a direction determined by the direction of rotation of the shaft carrying the one pulley of said pair which is clamped to its shaft; and at least one pair of parallel guide rails, said belt being interposed beneath and between said rails and rotating freely thereunder, whereby paper sheets can be fed between said rails and onto said belt and transferred thereby, the vertical clearance between said belt and said rails being small enough to prevent said sheets from being jammed between belt and rails and being large enough to permit free rotation of said belt.

4. An office conveyor as set forth in claim 3 wherein said rails are formed from a plurality of sections butted together.

5. An office conveyor comprising first and second parallel horizontally separated rotatable shafts; driving means connected to said shafts for rotating same in opposite directions; at least one pair of pulleys, one pulley in each pair being rotatably mounted on said first shaft, the other pulley being mounted on said second shaft, each pulley being provided with a separate rotation adjustment mechanism having a first position in which the pulley is clamped to its shaft and rotates therewith and a second position in which the pulley rotates freely and independently of its shaft, the two mechanisms for each pair of pulleys having different positions; at least one endless belt mounted around and between the corresponding pulley pair and driven thereby in a direction determined by the direction of rotation of the shaft carrying the one pulley of said pair which is clamped to its shaft; and at least one pair of parallel guide rails, said belt being interposed beneath and between said rails and rotating freely thereunder, whereby paper sheets can be fed between said rails and onto said belt and transferred thereby, the vertical clearance between said belt and said rails being small enough to prevent said sheets from being jammed between belt and rails and being large enough to permit free rotation of said belt each rail being formed from a plurality of sections of tongue and groove construction, adjacent sections being interlocked and aligned.

6. An office conveyor comprising first and second parallel horizontally separated rotatable shafts; driving means connected to said shafts for rotating same in opposite directions; at least one pair of pulleys, one pulley in each pair being rotatably mounted on said first shaft, the other pulley being mounted on said second shaft, each pulley being provided with a separate rotation adjustment mechanism having a first position in which the pulley is clamped to its shaft and rotates therewith and a second position in which the pulley rotates freely and independently of its shaft, the two mechanisms for each pair of pulleys having different positions; at least one endless belt mounted around and between the corresponding pulley pair and driven thereby in a direction determined by the direction of rotation of the shaft carrying the one pulley of said pair which is clamped to its shaft; at least one pair of parallel guide rails, said belt being interposed beneath and between said rails and rotating freely thereunder, whereby paper sheets can be fed between said rails and onto said belt and transferred thereby, the vertical clearance between said belt and said rails being small enough to prevent said sheets from being jammed between belt and rails and being large enough to permit free rotation of said belt, each rail being formed from a plurality of adjacent sections having common joints, and means to inject a jet of air through said rail in the region of each joint.

7. An office conveyor comprising first and second parallel horizontally separated rotatable shafts; driving means connected to said shafts for rotating same in opposite directions; at least one pair of pulleys, one pulley in each pair being rotatably mounted on said first shaft, the other pulley being mounted on said second shaft, each pulley being provided with a separate rotation adjustment mechanism having a first position in which the pulley is clamped to its shaft and rotates therewith and a second position in which the pulley rotates freely and independently of its shaft, the two mechanisms for each pair of pulleys having different positions; at least one endless belt mounted around and between the corresponding pulley pair and driven thereby in a direction determined by the direction of rotation of the shaft carrying the one pulley of said pair which is clamped to its shaft; and separate means for applying a constant tension to said belt.

8. In combination a rotatable shaft; a collar rigidly secured to said shaft and rotating therewith, said collar having at least one hole; a bushing riding freely on said collar; a pulley having a hub, said bushing being fitted into said hub; and a trigger lock mechanism mounted on said hub and having a pin, said mechanism having a first position in which said pin extends into said hole and clamps said pulley to said shaft whereby said pulley rotates in the same direction as said shaft and having a second position in which said pin is withdrawn from said hole whereby said pulley rotates freely and independently of said shaft.

9. In combination a rotatable shaft; a plurality of spaced apart collars, each collar being secured to said shaft and rotating therewith, each collar having at least one hole; a like plurality of bushings, each bushing riding freely on the corresponding collar; a like plurality of pulleys, each pulley having a hub, the corresponding bushing being fitted into the corresponding hub; and a like plurality of trigger lock mechanisms, each mechanism being mounted on the corresponding hub and having a pin, said mechanism having a first position in which said pin extends into said hole of the corresponding collar and clamps the corresponding pulley to said shaft whereby said corresponding pulley rotates in the same direction as said shaft and having a second position in which said pin is withdrawn from said hole whereby said corresponding pulley rotates freely and independently of said shaft, said mechanisms having positions at which at least one pulley is clamped to its shaft and the remaining pulleys rotate freely on said shaft.

10. An office conveyor comprising first and second parallel horizontally separated rotatable shafts; driving means connected to said shafts for rotating same in opposite directions; at least one pair of pulleys, one pulley in each pair being rotatably mounted on said first shaft, the other pulley being mounted on said second shaft, each pulley being provided with a separate rotation adjustment mechanism having a first position in which the pulley is clamped to its shaft and rotates therewith and a second position in which the pulley rotates freely and independently of its shaft, the two mechanisms for each pair of pulleys having different positions; at least one endless belt mounted around and between the corresponding pulley pair and driven thereby in a direction determined by the diretcion of rotation of the shaft carrying the one pulley of said pair which is clamped to its shaft; at least one pair of parallel guide rails, said belt being interposed beneath and between said rails and rotating freely thereunder, whereby paper sheets can be fed between said rails and onto said belt and transferred thereby, the vertical clearance between said belt and said rails being small enough to prevent said sheets from being jammed between belt and rails and being large enough to permit free rotation of said belt, each rail being formed from a plurality of adjacent sections having common joints, and means to inject at least one jet of air between adjacent rails in the region of each joint.

References Cited in the file of this patent

UNITED STATES PATENTS

| | | |
|---|---|---|
| 1,950,812 | Plausics | Mar. 13, 1934 |
| 2,355,901 | Beede | Aug. 15, 1944 |
| 2,853,179 | Norin | Sept. 23, 1958 |